US011861178B2

(12) United States Patent
Xu et al.

(10) Patent No.: US 11,861,178 B2
(45) Date of Patent: Jan. 2, 2024

(54) MANAGING A HYBRID ERROR RECOVERY PROCESS IN A MEMORY SUB-SYSTEM

(71) Applicant: Micron Technology, Inc., Boise, ID (US)

(72) Inventors: Zhongguang Xu, San Jose, CA (US); Jian Huang, Union City, CA (US); Tingjun Xie, Milpitas, CA (US); Murong Lang, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 144 days.

(21) Appl. No.: 17/462,605

(22) Filed: Aug. 31, 2021

(65) Prior Publication Data

US 2023/0069559 A1 Mar. 2, 2023

(51) Int. Cl.
 *G06F 3/06* (2006.01)
(52) U.S. Cl.
 CPC .......... *G06F 3/0619* (2013.01); *G06F 3/0655* (2013.01); *G06F 3/0679* (2013.01)

(58) Field of Classification Search
 CPC ..... G06F 3/0619; G06F 3/0655; G06F 3/0679
 See application file for complete search history.

(56) References Cited

U.S. PATENT DOCUMENTS

| | | | | |
|---|---|---|---|---|
| 2017/0003880 | A1* | 1/2017 | Fisher | ................... G06F 3/0655 |
| 2018/0341552 | A1* | 11/2018 | Liikanen | ............... G11C 29/021 |
| 2018/0374550 | A1* | 12/2018 | Barndt | ................. G11C 29/021 |
| 2019/0205244 | A1* | 7/2019 | Smith | ..................... G06F 3/065 |
| 2019/0295658 | A1* | 9/2019 | Amaki | ............... G11C 11/5642 |
| 2020/0133528 | A1* | 4/2020 | Sheperek | .............. G06F 3/0655 |
| 2022/0188177 | A1* | 6/2022 | Lee | ..................... G06F 11/0727 |

* cited by examiner

*Primary Examiner* — Jason W Blust
(74) *Attorney, Agent, or Firm* — Lowenstein Sandler LLP

(57) ABSTRACT

A request to perform a memory access operation on a plurality of memory cells of a memory device is receive. A request type associated with the memory access operation is determined. In response to determining that the request type associated with the request type associated with the memory access operation is a first request type, an error recovery operation associated with the first request type is performed. In response to determining that the request type associated with the memory access operation is a second request type, an error recovery operation associated with the second request type is performed.

20 Claims, 5 Drawing Sheets

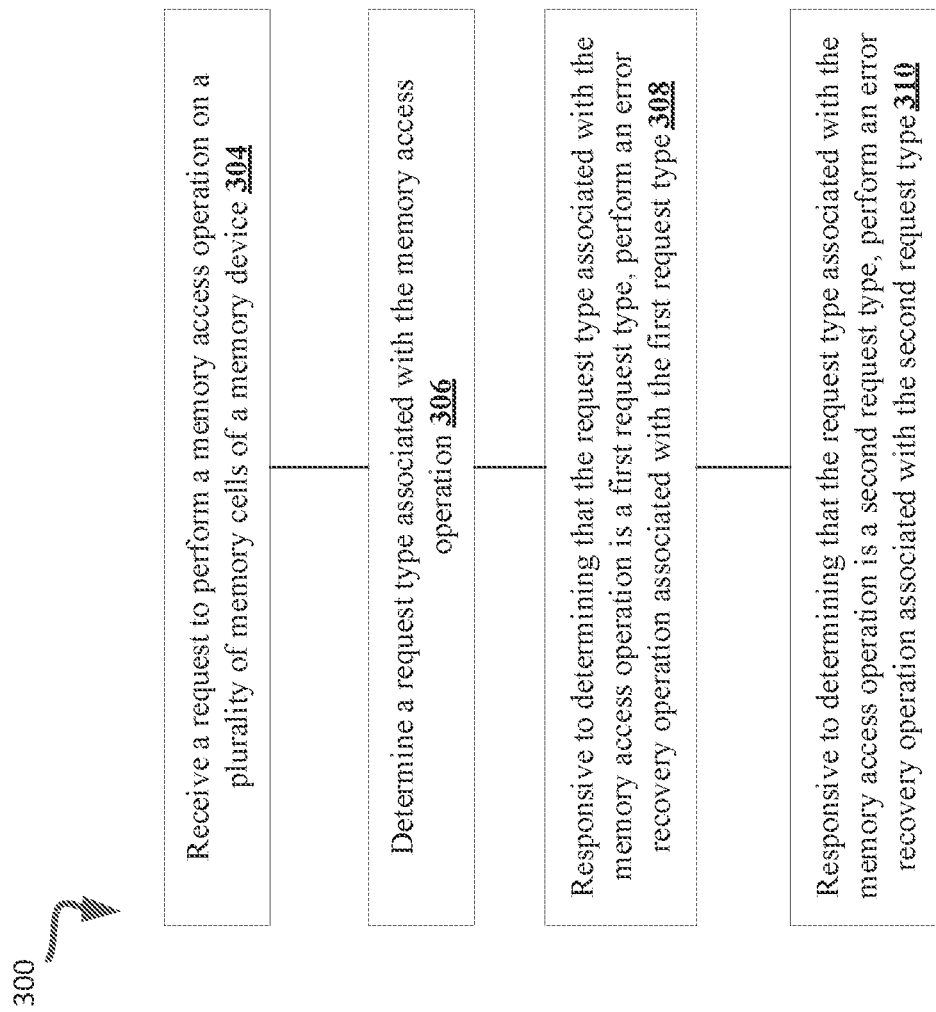

400

Receive a request to perform a memory access operation on a plurality of memory cells of a memory device 404

Determine a request type associated with the memory access operation 406

Responsive to determining that the request type associated with the memory access operation is a first request type, perform an error recovery operation associated with the first request type 408

Responsive to performing the error recovery operation associated with the first request type, determine an error rate associated with performing a set of read operations of the error recovery operation associated with the first request type 410

Responsive to determining the error rate associated with performing the set of read operations of the error recovery operation associated with first request type satisfies an error rate threshold, perform an error recovery operation associated with a second request type 412

FIG. 4

MANAGING A HYBRID ERROR RECOVERY PROCESS IN A MEMORY SUB-SYSTEM

TECHNICAL FIELD

Embodiments of the disclosure relate generally to memory sub-systems, and more specifically, relate to managing a hybrid error recovery process in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example method to manage a hybrid error recovery process in a memory device, in accordance with some embodiments of the present disclosure.

FIG. 4 is a flow diagram of an example method to manage a hybrid error recovery process in a memory device, in accordance with some embodiments of the present disclosure.

DETAILED DESCRIPTION

Figure 1:
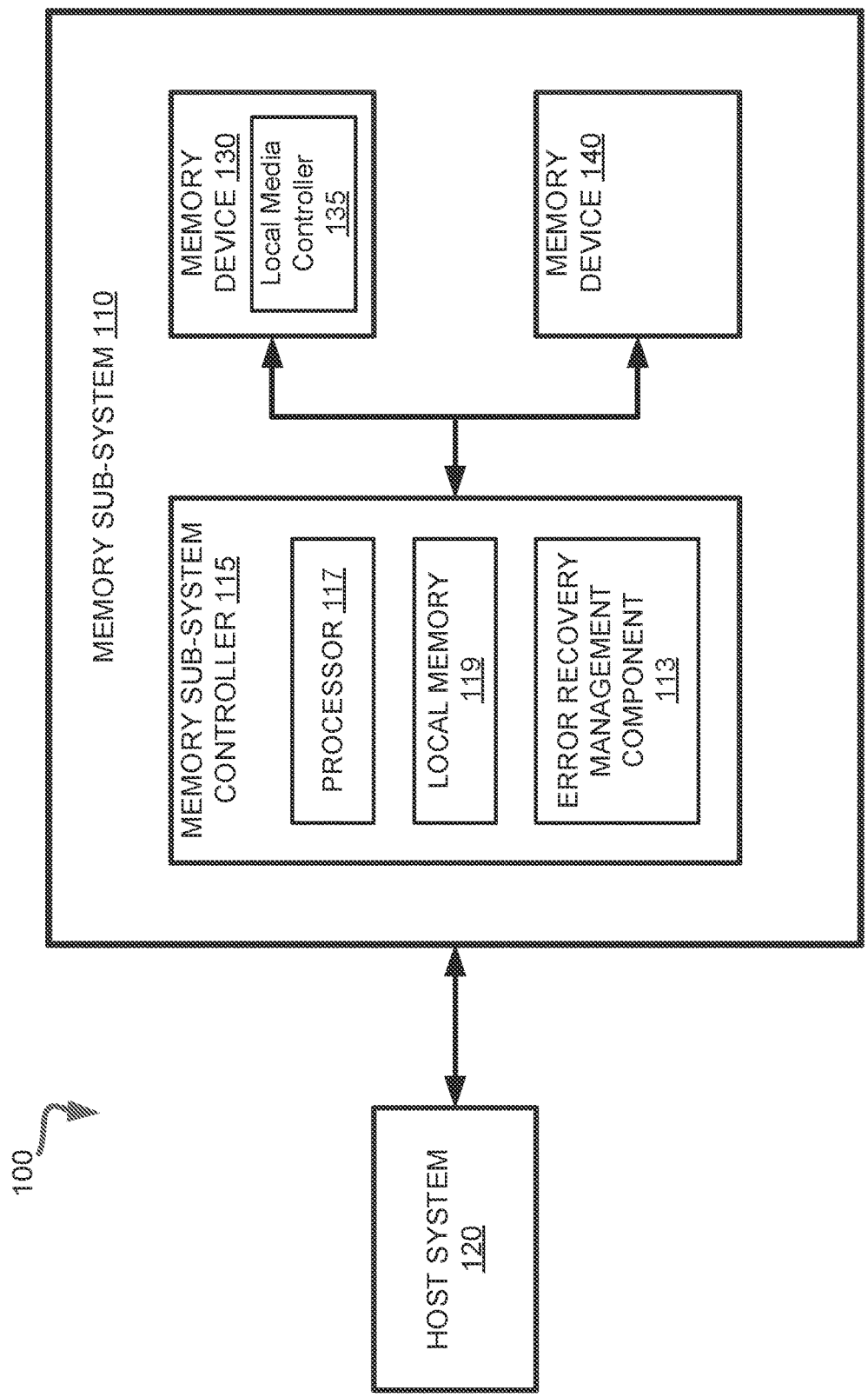
FIG. 1 illustrates an example computing system that includes a memory sub-system in accordance with some embodiments of the present disclosure.

Aspects of the present disclosure are directed to applying a hybrid error recovery process in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Another example of non-volatile memory devices is a three-dimensional cross-point ("3D cross-point") memory device that is a cross-point array of non-volatile memory that can perform bit storage based on a change of bulk resistance, in conjunction with a stackable cross-gridded data access array. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. For example, a single level cell (SLC) can store one bit of information and has two logic states. The various logic states have corresponding threshold voltage levels. A threshold voltage (VT) is the voltage applied to the cell circuitry (e.g., control gate voltage at which a transistor becomes conductive) to set the state of the cell. A cell is set to one of its logic states based on the VT that is applied to the cell. For example, if a high VT is applied to an SLC, a charge will be present in the cell, setting the SLC to store a logic 0. If a low VT is applied to the SLC, a charge will be absent in the cell, setting the SLC to store a logic 1.

Certain memory devices have threshold voltage programming distributions that move or "drift" higher over time. At a given read voltage level (i.e., a value of the voltage applied to a memory cell as part of a read operation), if the threshold voltage programming distributions move, then certain reliability statistics can also be affected. One example of a reliability statistic is a raw bit error rate (RBER). The RBER can be defined as the ratio of the number of erroneous bits to the number of all bits stored in a unit of the memory sub-system, where the unit can be the entire memory sub-system, a die of the memory device, a collection of codewords, or any other meaningful portion of the memory sub-system.

A read operation can be performed with a read voltage level. The read voltage level or value (herein the "read voltage level") can be a particular voltage that is applied to memory cells of a memory device to read the data stored at the memory cells. For example, if a threshold voltage of a particular memory cell is identified as being below the read voltage level that is applied to the particular memory cell, then the data stored at the particular memory cell can be a particular value (e.g., 1). If the threshold voltage of the particular memory cell is identified as being above the read voltage level, then the data stored at the particular memory cell can be another value (e.g., 0). Thus, the read voltage level can be applied to memory cells to determine values stored at the memory cells.

In a conventional memory sub-system, when the threshold voltage programming distributions of a memory cell change, the application of the read voltage level can be inaccurate relative to the changed threshold voltage. For example, a memory cell can be programmed to have a threshold voltage below the read voltage level. The programmed threshold voltage can change over time and can shift to be above the read voltage level. For example, the threshold voltage of the memory cell can shift from initially being below the read voltage level to being above the read voltage level. As a result, when the read voltage level is applied to the memory cell, the data stored at the memory cell can be misread or misinterpreted to be at a wrong value as compared to the value as originally stored when the threshold voltage had not yet shifted.

The speed or rate of the drift of the threshold voltage programming distributions and corresponding RBER of a conventional memory sub-system can be affected by one or more characteristics of the memory sub-system, such as cycling conditions, changes in die temperature, and read/write disturb conditions. For example, a set (e.g., establishing a "1" value) and reset (e.g., establishing a "0" value) cycling in a 3D cross-point system can degrade the memory cells having wider threshold voltage distributions. The set distribution can have a first leading edge (E1) and a second trailing edge (E2). Further, the reset distribution can have a first leading edge (E3) and a second trailing edge (E4). Cycling conditions can cause longer edge tails between adjacent programming distributions (e.g., the E2 and E3 tails). Longer edge tails, particularly the E2 and E3 tails, can be caused by severe write disturb, read disturb, or both. In addition, temperature conditions and delays between cycles can cause degradation variation from memory device to memory device. For example, higher temperatures and longer delays between cycles can lead to greater threshold voltage drift and degradation.

The threshold voltage drift and degradation cause errors during the performance of a memory access operation (e.g., a read operation, write operation etc.) at a memory device. For example, while performing a read operation, a memory sub-system controller can misread bits representing data stored at the memory device (i.e., the stored value is read incorrectly). In another example, one or more bits representing data stored at the memory device can contain errors (i.e., the value is stored incorrectly). Either situation can result in an error during performance of a read operation (e.g., a memory access operation error). Upon detecting that a memory access operation error has occurred, the memory sub-system controller can perform an error correction operation to correct the errors in the data and perform the memory access operation again to access the corrected data. In some instances, an error correction operation can be a memory scrubbing operation, where the memory sub-system controller corrects an error in the data and writes the corrected data back to the memory device.

To address errors due to threshold voltage drift, conventional memory sub-systems typically employ a predefined error recovery process including a preset sequence of read retry operations at different read retry voltage levels (hereinafter also referred to as "demarcation voltages") to enable error correction and data recovery. The error recovery process can include the execution of a sequence of multiple read retry operations to re-read data as part of an error correction process. In an embodiment, the error recovery process can include the use of multiple different read retry demarcation voltages including a base value (e.g., read retry demarcation voltage 1 ($V_{r1}$)), a second value offset from the base value (e.g., read retry demarcation voltage 2 ($V_{r2}$)), and a third value offset from the base value (e.g., read retry demarcation voltage 3 ($V_{r3}$)). The three read retry demarcation voltages are intended to cover the voltage drift range over different periods of time. For example, read retry operation 1 (i.e., execution of a read retry operation at $V_{r1}$) is employed during a first time period of the error recovery process (e.g., a time range of 1 microsecond to a few seconds), read retry operation 2 (i.e., execution of the read retry operation at $V_{r2}$) is employed during a second time period (e.g., a time range of a few seconds to a few hours), and read retry operation 3 (i.e., execution of a read retry operation at $V_{r3}$) is employed during a third time period exceeding a few hours to cover longer voltage drifts.

However, executing a fixed sequence of read retry operations can result in the application of a read retry demarcation voltage that causes read corruption. For example, applying a higher-than-optimal read retry demarcation voltage to one or more memory cells of a memory device can result in a reset cell that is incorrectly read as a set cell, and thus will be further pushed lower to the set cell region. This can cause a further mixing of reset and set threshold voltage distributions and data corruption. There is thus an impact on the reliability of data of the memory device. In addition, as the memory sub-system seeks to reduce impact on the reliability of data, the memory sub-system can perform additional sequences of read retry operations at lower demarcation voltages to ensure that the data is read correctly. However, performing additional read retry operations can impact performance by utilizing more resources of the memory device. Thus, conventional memory sub-systems face a trade-off between achieving high performance and high reliability of the memory device when using the same predefined error recovery process to address errors for all memory access operations.

Aspects of the present disclosure address the above and other deficiencies by providing a memory sub-system that manages the execution of a hybrid error recovery process. In certain embodiments, a memory sub-system controller can receive a request to perform a memory access operation on a set of memory cells of a memory device. The memory sub-system controller can determine the request type of the memory access operation (e.g., whether the request to perform the memory access operation is from a host system or a background operation such as a data refresh operation). The memory sub-system controller can perform an error recovery operation based on the request type. For example, the memory sub-system controller can perform one type of error recovery operation based on whether the request is from the host system, and the memory sub-system controller can perform another type of error recovery operation based on whether the request is from a background operation.

In one example, performing the error recovery operation for a request from the host system can include determining a set of demarcation voltages associated with the request from the host system. The set of demarcation voltages can include a number of demarcation voltages that is lower than a number of demarcation voltages associated with the request from the background operation. A starting voltage in the set of demarcation voltages can further correspond to a higher voltage than a starting voltage in a set of demarcation voltages associated with the request from the background operation. The memory sub-system controller can perform a read retry operation of a set of read retry operations on the set of memory cells using the set of demarcation voltages. The memory sub-system controller can determine an error rate associated with performing the read retry operation. The memory sub-system controller can determine that the error rate satisfies an error rate threshold (e.g., the read retry operation results in an error such as a UECC error, or uncorrectable error correction code error). In response to determining that the error rate satisfies the error rate threshold, the memory sub-system controller can perform another read retry operation using a sequential demarcation voltage of the set of demarcation voltages. In some embodiments, the memory sub-system controller can determine the error rate associated with performing each read retry operation of the set of read retry operations. In response to determining that the error rate associated with performing each read retry operation of the set of read retry operations satisfies the error rate threshold (e.g., each read retry operation results in an error such as a UECC), the memory sub-system controller can perform the error recovery operation associated with a request from a background operation.

In one example, performing the error recovery operation for a request from a background operation can include determining a set of demarcation voltages associated with the request from the background operation. The set of demarcation voltages can include a number of demarcation voltages that is greater than the number of demarcation voltages associated with the request from the host system. A starting voltage in the set of demarcation voltages can further correspond to a lower voltage than a starting voltage in the set of demarcation voltages associated with the request from the host system. The memory sub-system controller can perform a read retry operation of a set of read retry operations on the set of memory cells using the set of demarcation voltages. The memory sub-system controller can determine an error rate associated with performing the read retry operation. The memory sub-system controller can determine that the error rate satisfies an error rate threshold (e.g., the read retry operation results in an error such as a UECC). In response to determining that the error rate satisfies the error rate threshold, the memory sub-system controller can perform another read retry operation using a sequential demarcation voltage of the set of demarcation voltages.

Advantages of the present disclosure include, but are not limited to, improving the reliability and performance of memory devices by managing a hybrid error recovery process based on a request type for each memory access operation (e.g., from a host system or from a background operation). By having different sequences of read retry operations depending on the request type for each memory access operation, a memory sub-system can balance the trade-off between reliability and performance that conventional memory sub-systems face. Advantageously, the memory sub-system can have one type of error recovery process for memory access operations from a host system aimed at enhancing performance by reducing the number of read retry operations and increasing the demarcation voltage levels. The memory sub-system can have another type of error recovery process for memory access operations from a background operation aimed at increasing data reliability by increasing the number of read retry operations and decreasing demarcation voltage levels. Accordingly, both the performance and reliability of the memory device can be improved by applying a hybrid error recovery process that takes into account the type of memory access operation.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes an error recovery management component 113 that can be used to apply a hybrid error recovery process for a memory device (e.g., the memory device 130). In some embodiments, the memory sub-system controller 115 includes at least a portion of the error recovery management component 113. In some embodiments, the error recovery management component 113 is part of the host system 110, an application, or an operating system. In other embodiments, local media controller 135 includes at least a portion of the error recovery management component 113 and is configured to perform the functionality described herein.

The error recovery management component 113 can receive a request to perform a memory access operation on a set of memory cells of the memory device. The error recovery management component 113 can determine a request type associated with the memory access operation. For example, the request type could be one of a host input/output (I/O) operation or a background operation. In response to determining that the request type associated with the memory access operation is a certain request type (e.g., a host I/O operation), the error recovery management component 113 can perform an error recovery operation associated with the certain request type. In response to determining that the request type associated with the memory access operation is another request type (e.g., a background operation), the error recovery management component 113 can perform an error recovery operation associated with the other request type. The error recovery management component 113 can determine the request type associated with the memory access operation based on a bit of a set of bits for the memory access operation. The request types can include a request from a host system and a request from a background operation.

Performing the error recovery operation for a request from the host system can include determining a set of demarcation voltages associated with the request from the host system. The set of demarcation voltages can include a number of demarcation voltages that is less than a number of demarcation voltages associated with a request from the background operation. The set of demarcation voltages can further include a base value demarcation voltage that corresponds to a higher voltage than a base value demarcation voltage of a set of demarcation voltages associated with a request from the background operation. The error recovery management component 113 can perform a read operation (e.g., a read retry operation) of a set of read operations on the set of memory cells using a demarcation voltage of the set of demarcation voltages. The error recovery management component 113 can determine an error rate associated with performing the read operation. In response to determining that the error rate associated with performing the read operation satisfies an error rate threshold (e.g., the read operation results in a read error or UECC error), the error recovery management component 113 can perform another read operation on the set of memory cells using a sequential demarcation voltage of the set of demarcation voltages. In some embodiments, the error recovery management component 113 can determine the error rate associated with performing each read operation of the set of read operations. In response to determining that the error rate associated with performing each read operations of the set of read operations satisfies the error rate threshold (e.g., the read operation results in a read error or UECC error), the error recovery management component 113 can perform the error recovery operation associated with the other request type (i.e., the background operation).

Performing the error recovery operation for a request from the background operation can include determining a set of demarcation voltages associated with the request from the host system. The set of demarcation voltages can include a number of demarcation voltages that is greater than the number of demarcation voltages associated with the request from the host system. The set of demarcation voltages can further include a base value demarcation voltage that corresponds to a lower voltage than the base value demarcation voltage of the set of demarcation voltages associated with the request from the host system. The error recovery management component 113 can perform a read operation (e.g., a read retry operation) on the set of memory cells using a demarcation voltage of the set of demarcation voltages. The error recovery management component 113 can determine an error rate associated with performing the read operation. In response to determining that the error rate associated with performing the read operation satisfies an error rate threshold (e.g., the read operation results in a read error or UECC error), the error recovery management component 113 can perform another read operation on the set of memory cells using a sequential demarcation voltage of the set of demarcation voltages.

Further details with regards to the operations of the error recovery management component 113 are described below.

Figure 2:
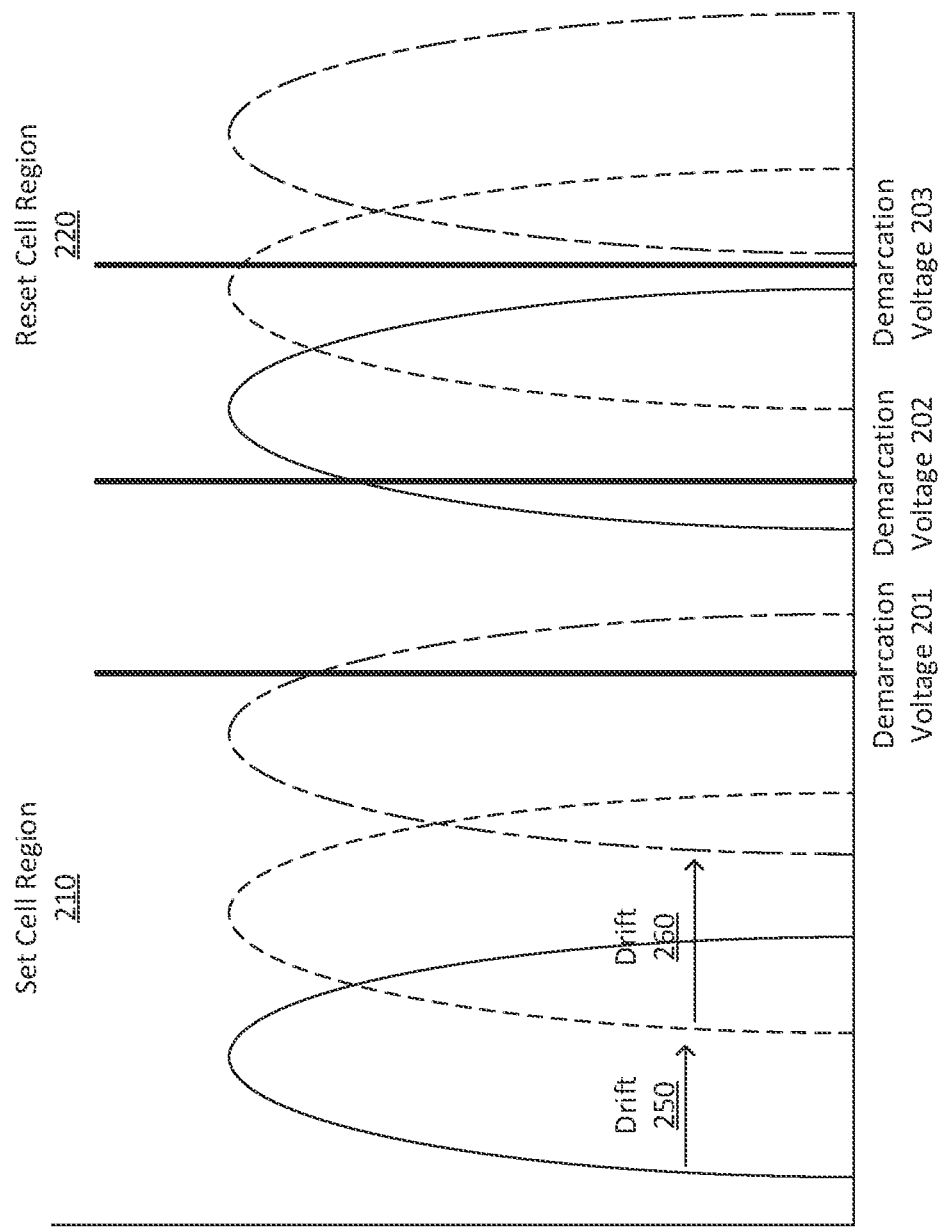
FIG. 2 illustrates an example graph of threshold voltage programming distributions with drifts over time for a memory device, in accordance with some embodiments of the present disclosure.

FIG. 2 illustrates an example graph of threshold voltage programming distributions with drifts over time for a memory device, in accordance with some embodiments of the present disclosure. Threshold voltage programming distributions for memory cells can drift over time due to one or more characteristics of a memory sub-system, such as cycling conditions, changes in die temperature, and read/write disturb conditions. FIG. 2 illustrates the threshold voltage programming distributions for two regions of memory cells, a set cell region 210 and a reset cell region 220. The set cell region 210 can establish a logic state value of "1," and the reset cell region 220 can establish a logic state value of "0." Each region can experience a threshold voltage that drifts over time. For example, the threshold voltage programming distribution for the set cell region 210 can drift from drift 250 to drift 260 and further. In conventional memory sub-systems, there can be an error recovery process that include the use of multiple different read retry demarcation voltages. For example, as illustrated in FIG. 2, there can be an error recovery process that includes a base demarcation voltage 201, a second demarcation voltage 202, and a third demarcation voltage 203. Each demarcation voltage can cover the voltage drift range over different periods of time. For example, the demarcation voltage 201 can cover a time range of 1 microsecond to a few seconds. The demarcation voltage 202 can cover a time range of a few second to a few hours. The demarcation voltage 203 can cover a time range of a few hours to longer periods of time. However, as discussed herein above, executing a fixed sequence of read retry operations can result in the application of a read retry demarcation voltage that causes read corruption. For example, applying a higher-than-optimal read retry demarcation voltage, such as the demarcation voltage 202, to one or more memory cells of the set cell region 210 can result in a an incorrectly read cell.

FIG. 3 is a flow diagram of an example method 300 for managing a hybrid error recovery flow process in a memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the error recovery management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 304, the processing logic receives a request to perform a memory access operation on a set of memory cells of a memory device. The memory access operation can include operations such as read, write, wear leveling, data refresh, and erase operations. In some embodiments, the processing logic can receive the request from a host system or a controller component of the memory device. In some embodiments, in response to receiving the request to perform the memory access operation, the processing logic can determine that the set of memory cells is associated with a disturb error, e.g., a write disturb error and/or a read disturb error. In some embodiments, in response to receiving the request to perform the memory access operation, the processing logic can determine that the set of memory cells is associated with a data degradation.

At operation 306, the processing logic determines a request type associated with the memory access operation. In some embodiments, determining the request type associated with the memory access operation can include determining the request type based on a bit of a set of bits representing the memory access operation. For example, the memory access operation can include a bit indicating the request type based on a fixed value represented by the bit (e.g., 0 or 1). In some embodiments, the request type can include a request from the host system and/or a request from the controller component to perform a background operation. In some embodiments, the processing logic can determine that the request type associated with the memory access operation is a request from the host system. In some embodiments, the processing logic can determine that the request type associated with the memory access operation is a request to perform a background operation.

At operation 308, the processing logic performs an error recovery process associated with the request from the host system. In some embodiments, the processing logic performs the error recovery process in response to determining that the request type associated with the memory access operation is the request from the host system. In some embodiments, performing the error recovery operation associated with the request from the host system can include identifying a set of demarcation voltages associated with the request from the host system. For example, the set of demarcation voltages associated with the request from the host system can be based on predefined media characterization of the memory device. The set of demarcation voltages associated with the request from the host system can vary based on the characteristics of the memory device. In some embodiments, the set of demarcation voltages can include a number of demarcation voltages less than a number of demarcation voltages associated with the request to perform the background operation. For example, as illustrated in FIG. 2, the set of demarcation voltages associated with the request from the host system can include a set of read operations (e.g., read retry operations) including demarcation voltage 202 and demarcation voltage 203 (e.g., demarcation voltage 202—demarcation voltage 202—demarcation voltage 203). In some embodiments, a base demarcation voltage (i.e., starting value demarcation voltage) of the set of demarcation voltages can correspond to a higher voltage than a base demarcation voltage of a set of demarcation voltages associated with the request to perform the background operation. For example, as illustrated in FIG. 2, the base demarcation voltage can be demarcation voltage 202. In some embodiments, the processing logic can perform a read retry operation of the set of read retry operations. The processing logic can perform the read retry operation using a demarcation voltage of the set of demarcation voltages. For example, the processing logic can perform the read retry operation using the base demarcation voltage. Performing the read retry can include reading the data stored at the set of memory cells using the base demarcation voltage. In some embodiments, the processing logic can determine an error rate associated with performing the read retry operation. In some embodiments, the processing logic can determine that the error rate associated with performing the read retry operation satisfies an error rate threshold. Determining that the error rate satisfies the error rate threshold can include determining that the error rate associated with performing the read retry operation resulted in a read error or a UECC error. In some embodiments, in response to determining the error rate satisfies the error rate threshold, the processing logic can perform another read retry operation of the set of read operations on the set of memory cells. In some embodiments, the other read retry operation can be performed using a sequential demarcation voltage of the set of demarcation voltages. For example, as illustrated in FIG. 2, the sequential demarcation voltage to base demarcation voltage 202 is demarcation voltage 203. In some embodiments, the processing logic can determine the error rate associated with performing the other read retry operation. If the processing logic determines that the error rate associated with performing the other read retry operation satisfies the error rate threshold, the processing logic can perform a third read retry operation on the set of memory cells.

In some embodiments, the processing logic can repeat the steps at operation 308 for each read retry operation of the set of read retry operations. In some embodiments, the processing logic can determine an error rate for a final read retry operation of the set of read retry operations. In response to determining that the error rate for the final read retry operation satisfies the error rate threshold, the processing logic can perform an error recovery process associated with the request to perform the background operation. Performing the error recovery process associated with the request to perform the background operation can include identifying the set of demarcation voltages associated with the request to perform the background operation. For example, the set of demarcation voltages associated with the request to perform the background operation can be based on predefined media characterization of the memory device. The set of demarcation voltages associated with the request to perform the background operation can vary based on the characteristics of the memory device. In some embodiments, the set of demarcation voltages can include a number of demarcation voltages greater than the number of demarcation voltages associated with the request from the host system. For example, as illustrated in FIG. 2, the set of demarcation voltages associated with the request to perform the background operation can include a set of read retry operations including demarcation voltage 201, demarcation voltage 202, and demarcation voltage 203 (e.g., demarcation voltage 201—demarcation voltage 201—demarcation voltage 201—demarcation voltage 202—demarcation voltage 202—demarcation voltage 203). In some embodiments, a base demarcation voltage (i.e., starting value demarcation voltage) of the set of demarcation voltages can correspond to a lower voltage than the base demarcation voltage of the set of demarcation voltages associated with the request from the host system. For example, as illustrated in FIG. 2, the base demarcation voltage can be demarcation voltage 201. In some embodiments, the processing logic can perform a read retry operation of the set of read retry operations. The processing logic can perform the read retry operation using a demarcation voltage of the set of demarcation voltages. For example, the processing logic can perform the read retry operation using the base demarcation voltage. Performing the read retry can include reading the data stored at the set of memory cells using the base demarcation voltage. In some embodiments, the processing logic can determine an error rate associated with performing the read retry operation. In some embodiments, the processing logic can determine that the error rate associated with performing the read retry operation satisfies the error rate threshold. Determining that the error rate satisfies the error rate threshold can include determining that the error rate associated with performing the read retry operation resulted in a read error or a UECC error. In some embodiments, in response to determining the error rate satisfies the error rate threshold, the processing logic can perform another read retry operation of the set of read operations on the set of memory cells. In some embodiments, the other read retry operation can be performed using a sequential demarcation voltage of the set of demarcation voltages. For example, as illustrated in FIG. 2, the sequential demarcation voltage to base demarcation voltage 201 is demarcation voltage 202. In some embodiments, the processing logic can determine the error rate associated with performing the other read retry operation. If the processing logic determines that the error rate associated with performing the other read retry operation satisfies the error rate threshold, the processing logic can perform a third read retry operation on the set of memory cells. In some embodiments, the processing logic can repeat the steps at operation 308 for each read retry operation of the set of read retry operations.

At operation 310, the processing logic performs the error recovery process associated with the request to perform the background operation. In some embodiments, the processing logic performs the error recovery process in response to determining that the request type associated with the memory access operation is the request to perform the background operation.

FIG. 4 is a flow diagram of an example method 400 for managing a hybrid error recovery flow process in a memory device, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the error recovery management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 404, the processing logic receives a request to perform a memory access operation on a set of memory cells of a memory device. The memory access operation can include operations such as read, write, wear leveling, data refresh, and erase operations. In some embodiments, the processing logic can receive the request from a host system or a controller component of the memory device. In some embodiments, in response to receiving the request to perform the memory access operation, the processing logic can determine that the set of memory cells is associated with a disturb error, e.g., a write disturb error and/or a read disturb error. In some embodiments, in response to receiving the request to perform the memory access operation, the processing logic can determine that the set of memory cells is associated with a data degradation.

At operation 406, the processing logic determines a request type associated with the memory access operation. In some embodiments, determining the request type associated with the memory access operation can include determining the request type based on a bit of a set of bits representing the memory access operation. For example, the memory access operation can include a bit indicating the request type based on a fixed value represented by the bit (e.g., 0 or 1). In some embodiments, the request type can include a request from the host system and/or a request from the controller component to perform a background operation. In some embodiments, the processing logic can determine that the request type associated with the memory access operation is a request from the host system. In some embodiments, the processing logic can determine that the request type associated with the memory access operation is a request to perform a background operation.

At operation 408, the processing logic performs an error recovery process associated with the request from the host system. In some embodiments, the processing logic performs the error recovery process in response to determining that the request type associated with the memory access operation is the request from the host system. In some embodiments, performing the error recovery operation associated with the request from the host system can include identifying a set of demarcation voltages associated with the request from the host system. For example, the set of demarcation voltages associated with the request from the host system can be based on predefined media characterization of the memory device. The set of demarcation voltages associated with the request from the host system can vary based on the characteristics of the memory device. In some embodiments, the set of demarcation voltages can include a number of demarcation voltages less than a number of demarcation voltages associated with the request to perform the background operation. For example, as illustrated in FIG. 2, the set of demarcation voltages associated with the request from the host system can include a set of read operations (e.g., read retry operations) including demarcation voltage 202 and demarcation voltage 203 (e.g., demarcation voltage 202—demarcation voltage 202—demarcation voltage 203). In some embodiments, a base demarcation voltage (i.e., starting value demarcation voltage) of the set of demarcation voltages can correspond to a higher voltage than a base demarcation voltage of a set of demarcation voltages associated with the request to perform the background operation. For example, as illustrated in FIG. 2, the base demarcation voltage can be demarcation voltage 202. In some embodiments, the processing logic can perform a read retry operation of the set of read retry operations. The processing logic can perform the read retry operation using a demarcation voltage of the set of demarcation voltages. For example, the processing logic can perform the read retry operation using the base demarcation voltage. Performing the read retry can include reading the data stored at the set of memory cells using the base demarcation voltage. In some embodiments, the processing logic can determine an error rate associated with performing the read retry operation. In some embodiments, the processing logic can determine that the error rate associated with performing the read retry operation satisfies an error rate threshold. Determining that the error rate satisfies the error rate threshold can include determining that the error rate associated with performing the read retry operation resulted in a read error or a UECC error. In some embodiments, in response to determining the error rate satisfies the error rate threshold, the processing logic can perform another read retry operation of the set of read operations on the set of memory cells. In some embodiments, the other read retry operation can be performed using a sequential demarcation voltage of the set of demarcation voltages. For example, as illustrated in FIG. 2, the sequential demarcation voltage to base demarcation voltage 202 is demarcation voltage 203. In some embodiments, the processing logic can determine the error rate associated with performing the other read retry operation. If the processing logic determines that the error rate associated with performing the other read retry operation satisfies the error rate threshold, the processing logic can perform a third read retry operation on the set of memory cells. In some embodiments, the processing logic can repeat the steps at operation 308 for each read retry operation of the set of read retry operations.

At operation 410, the processing logic determines an error rate associated with performing a set of read retry operations. In some embodiments, the processing logic determines the error rate associated with performing the set of read retry operations in response to performing the error recovery operation associated with the request from the host system. In some embodiments, determining the error rate associated with performing the set of read retry operations can include determining an error rate for each read retry operation of the set of read retry operations. The processing logic can determine that an error rate for a final read retry operation of the set of read retry operations satisfies the error rate threshold (e.g., performing the read retry operation results in a read error or a UECC error).

At operation 412, the processing logic performs an error recovery operation associated with the request to perform the background operation. In some embodiments, the processing logic performs the error recovery operation associated with the request to perform the background operation in response to determining that the error rate associated with performing the set of read retry operations satisfies the error rate threshold. Performing the error recovery process associated with the request to perform the background operation can include identifying the set of demarcation voltages associated with the request to perform the background operation. For example, the set of demarcation voltages associated with the request to perform the background operation can be based on predefined media characterization of the memory device. The set of demarcation voltages associated with the request to perform the background operation can vary based on the characteristics of the memory device. In some embodiments, the set of demarcation voltages can include a number of demarcation voltages greater than the number of demarcation voltages associated with the request from the host system. For example, as illustrated in FIG. 2, the set of demarcation voltages associated with the request to perform the background operation can include a set of read retry operations including demarcation voltage 201, demarcation voltage 202, and demarcation voltage 203 (e.g., demarcation voltage 201—demarcation voltage 201—demarcation voltage 201—demarcation voltage 202—demarcation voltage 202—demarcation voltage 203). In some embodiments, a base demarcation voltage (i.e., starting value demarcation voltage) of the set of demarcation voltages can correspond to a lower voltage than the base demarcation voltage of the set of demarcation voltages associated with the request from the host system. For example, as illustrated in FIG. 2, the base demarcation voltage can be demarcation voltage 201. In some embodiments, the processing logic can perform a read retry operation of the set of read retry operations. The processing logic can perform the read retry operation using a demarcation voltage of the set of demarcation voltages. For example, the processing logic can perform the read retry operation using the base demarcation voltage. Performing the read retry can include reading the data stored at the set of memory cells using the base demarcation voltage. In some embodiments, the processing logic can determine an error rate associated with performing the read retry operation. In some embodiments, the processing logic can determine that the error rate associated with performing the read retry operation satisfies the error rate threshold. Determining that the error rate satisfies the error rate threshold can include determining that the error rate associated with performing the read retry operation resulted in a read error or a UECC error. In some embodiments, in response to determining the error rate satisfies the error rate threshold, the processing logic can perform another read retry operation of the set of read operations on the set of memory cells. In some embodiments, the other read retry operation can be performed using a sequential demarcation voltage of the set of demarcation voltages. For example, as illustrated in FIG. 2, the sequential demarcation voltage to base demarcation voltage 201 is demarcation voltage 202. In some embodiments, the processing logic can determine the error rate associated with performing the other read retry operation. If the processing logic determines that the error rate associated with performing the other read retry operation satisfies the error rate threshold, the processing logic can perform a third read retry operation on the set of memory cells. In some embodiments, the processing logic can repeat the steps at operation 308 for each read retry operation of the set of read retry operations.

Figure 5:
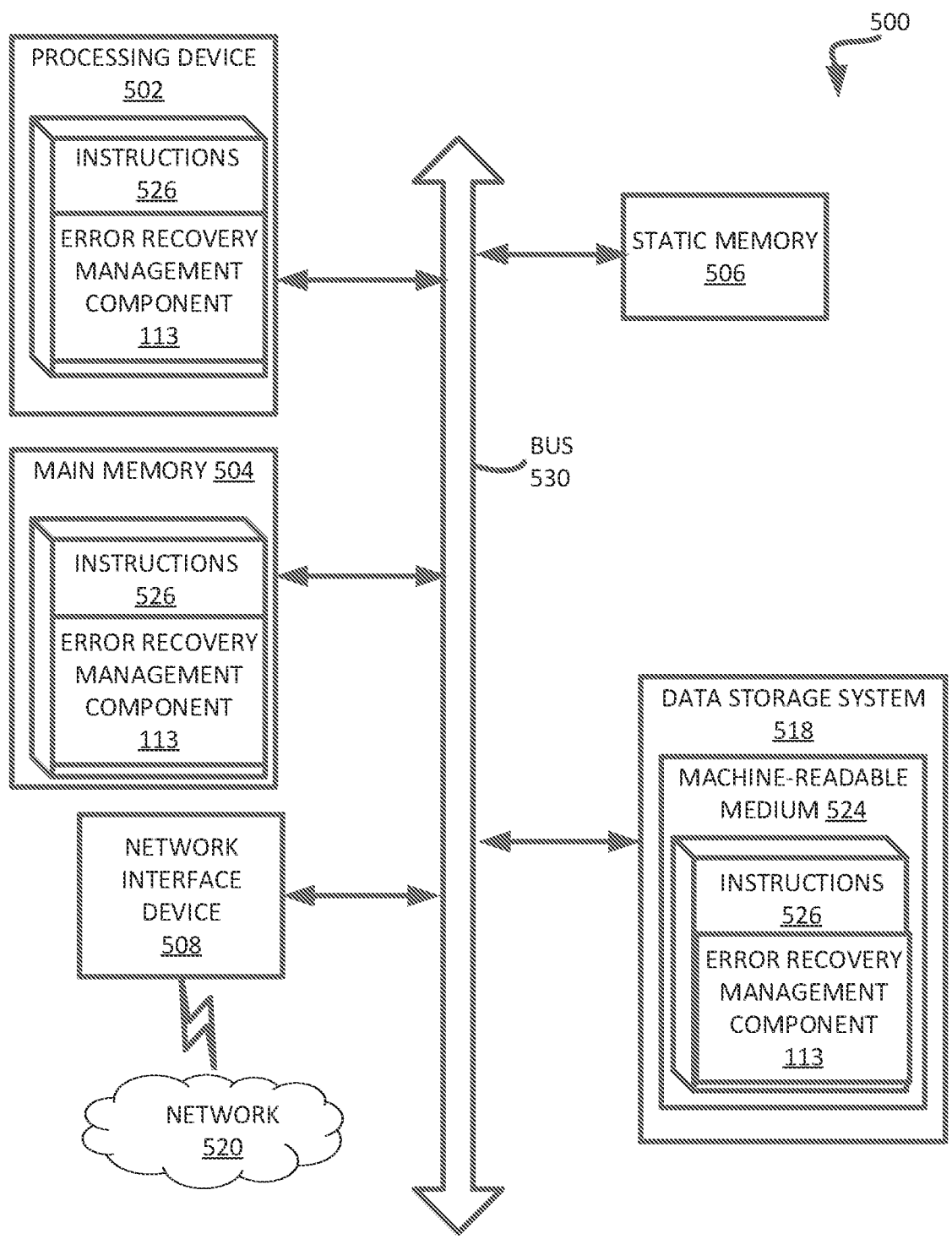
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the write disturb management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an error recovery management component (e.g., the error recovery management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
 a memory device; and
 a processing device, operatively coupled with the memory device, to perform operations comprising:
  receiving a request to perform a memory access operation on a plurality of memory cells of the memory device;
  determining a request type associated with the memory access operation;
  responsive to determining that the request type associated with the memory access operation is a first request type, performing an error recovery operation associated with the first request type, wherein performing the error recovery operation associated with the first request type comprises determining a first plurality of demarcation voltages associated with the first request type, and wherein the first request type corresponds to a request from a host; and responsive to determining that the request type associated with the memory access operation is a second request type, performing an error recovery operation associated with the second request type, wherein performing the error recovery operation associated with the second request type comprises determining a second plurality of demarcation voltages associated with the second request type, wherein the second plurality of demarcation voltages comprises a greater number of demarcation voltages than the first plurality of demarcation voltages associated with the first request type, and wherein the second request type corresponds to a request from a controller.

2. The system of claim 1, wherein determining the request type associated with the memory access operation comprises:
determining that the request type associated with the memory access operation is the first request type based on a bit of a plurality of bits associated with the memory access operation.

3. The system of claim 1, wherein determining the request type associated with the memory access operation comprises:
determining that the request type associated with the memory access operation is the second request type based on a bit of a plurality of bits associated with the memory access operation, wherein the request from the controller is to perform a background operation.

4. The system of claim 1,
wherein the first plurality of demarcation voltages is determined based on predefined media characterization, wherein the first plurality of demarcation voltages comprises a number of demarcation voltages less than a number of demarcation voltages associated with the second request type, wherein the first demarcation voltage of the first plurality of demarcation voltages corresponds to a higher voltage than the first demarcation voltage of the second plurality of demarcation voltages associated with the second request type, and wherein performing the error recovery operation associated with the first request type further comprises:
performing a first read operation on the plurality of memory cells using a demarcation voltage of the first plurality of demarcation voltages;
determining an error rate associated with performing the first read operation;
determining that the error rate associated with performing the first read operation satisfies an error rate threshold; and
responsive to determining that the error rate associated with performing the first read operation satisfies the error rate threshold, performing a second read operation on the plurality of memory cells using a sequential demarcation voltage of the first plurality of demarcation voltages.

5. The system of claim 4, further comprising:
determining an error rate associated with performing the second read operation; and
responsive to determining that the error rate associated with performing the second read operation satisfies the error rate threshold, performing the error recovery operation associated with the second request type.

6. The system of claim 1, wherein the second plurality of demarcation voltages is determined based on predefined media characterization, wherein a first demarcation voltage of the second plurality of demarcation voltages corresponds to a lower voltage than a first demarcation voltage of the first plurality of demarcation voltages associated with the first request type, and wherein performing the error recovery operation associated with the second request type further comprises:
performing a first read operation on the plurality of memory cells using a demarcation voltage of the second plurality of demarcation voltages;
determining an error rate associated with performing the first read operation;
determining that the error rate associated with performing the first read operation satisfies an error rate threshold; and
responsive to determining that the error rate associated with performing the first read operation satisfies the error rate threshold, performing a second read operation on the plurality of memory cells using a sequential demarcation voltage of the second plurality of demarcation voltages.

7. The system of claim 1, further comprising:
responsive to receiving the request to perform the memory access operation on the plurality of memory cells of the memory device, determining that the plurality of memory cells is associated with a write disturb error.

8. A method comprising:
receiving a request to perform a memory access operation on a plurality of memory cells of a memory device;
determining a request type associated with the memory access operation;
responsive to determining that the request type associated with the memory access operation is a first request type, performing an error recovery operation associated with the first request type, wherein performing the error recovery operation associated with the first request type comprises determining a first plurality of demarcation voltages associated with the first request type, and wherein the first request type corresponds to a request from a host; and
responsive to determining that the request type associated with the memory access operation is a second request type, performing an error recovery operation associated with the second request type, wherein performing the error recovery operation associated with the second request type comprises determining a second plurality of demarcation voltages associated with the second request type, wherein the second plurality of demarcation voltages comprises a greater number of demarcation voltages than the first plurality of demarcation voltages associated with the first request type, and wherein the second request type corresponds to a request from a controller.

9. The method of claim 8, wherein determining the request type associated with the memory access operation comprises:
determining that the request type associated with the memory access operation is the first request type based on a bit of a plurality of bits associated with the memory access operation.

10. The method of claim 8, wherein determining the request type associated with the memory access operation comprises:
  determining that the request type associated with the memory access operation is the second request type based on a bit of a plurality of bits associated with the memory access operation, wherein the request from the controller is to perform a background operation.

11. The method of claim 8, wherein the first plurality of demarcation voltages is determined based on predefined media characterization, wherein the first plurality of demarcation voltages comprises a number of demarcation voltages less than a number of demarcation voltages associated with the second request type, wherein a first demarcation voltage of the first plurality of demarcation voltages corresponds to a higher voltage than a first demarcation voltage of the second plurality of demarcation voltages associated with the second request type, and wherein performing the error recovery operation associated with the first request type further comprises:
  performing a first read operation on the plurality of memory cells using a demarcation voltage of the first plurality of demarcation voltages;
  determining an error rate associated with performing the first read operation;
  determining that the error rate associated with performing the first read operation satisfies an error rate threshold; and
  responsive to determining that the error rate associated with performing the first read operation satisfies the error rate threshold, performing a second read operation on the plurality of memory cells using a sequential demarcation voltage of the first plurality of demarcation voltages.

12. The method of claim 11, further comprising:
  determining an error rate associated with performing the second read operation; and
  responsive to determining that the error rate associated with performing the second read operation satisfies the error rate threshold, performing the error recovery operation associated with the second request type.

13. The method of claim 8, wherein the second plurality of demarcation voltages is determined based on predefined media characterization, wherein a first demarcation voltage of the second plurality of demarcation voltages corresponds to a lower voltage than a first demarcation voltage of the first plurality of demarcation voltages associated with the first request type and wherein performing the error recovery operation associated with the second request type comprises:
  performing a first read operation on the plurality of memory cells using a demarcation voltage of the second plurality of demarcation voltages;
  determining an error rate associated with performing the first read operation;
  determining that the error rate associated with performing the first read operation satisfies an error rate threshold; and
  responsive to determining that the error rate associated with performing the first read operation satisfies the error rate threshold, performing a second read operation on the plurality of memory cells using a sequential demarcation voltage of the second plurality of demarcation voltages.

14. The method of claim 8, further comprising:
  responsive to receiving the request to perform the memory access operation on the plurality of memory cells of the memory device, determining that the plurality of memory cells is associated with a write disturb error.

15. A non-transitory computer-readable storage medium comprising instructions that, when executed by a processing device, cause the processing device to perform operations comprising:
  receiving a request to perform a memory access operation on a plurality of memory cells of a memory device;
  determining a request type associated with the memory access operation;
  responsive to determining that the request type associated with the memory access operation is a first request type, performing an error recovery operation associated with the first request type, wherein performing the error recovery operation associated with the first request type comprises determining a first plurality of demarcation voltages associated with the first request type, and wherein the first request type corresponds to a request from a host;
  responsive to performing the error recovery operation associated with the first request type, determining an error rate associated with performing a set of read operations of the error recovery operation associated with the first request type; and
  responsive to determining that the error rate associated with performing the set of read operations of the error recovery operation associated with the first request type satisfies an error rate threshold, performing an error recovery operation associated with a second request type, wherein performing the error recovery operation associated with the second request type comprises determining a second plurality of demarcation voltages associated with the second request type, wherein the second plurality of demarcation voltages comprises a greater number of demarcation voltages than the first plurality of demarcation voltages associated with the first request type, and wherein the second request type corresponds to a request from a controller.

16. The non-transitory computer-readable storage medium of claim 15, wherein the processing device is to perform operations further comprising:
  responsive to determining that the request type associated with the memory access operation is the second request type, performing the error recovery operation associated with the second request type.

17. The non-transitory computer-readable storage medium of claim 15, wherein the first plurality of demarcation voltages is determined based on predefined media characterization, wherein the first plurality of demarcation voltages comprises a number of demarcation voltages less than a number of demarcation voltages associated with the second request type, wherein a first demarcation voltage of the first plurality of demarcation voltages corresponds to a higher voltage than a first demarcation voltage of the second plurality of demarcation voltages associated with the second request type, and wherein performing the error recovery operation associated with the first request type further comprises:
  performing a first read operation of the set of read operations on the plurality of memory cells using a demarcation voltage of the first plurality of demarcation voltages;
  determining that the error rate associated with performing the first read operation satisfies the error rate threshold; and responsive to determining that the error rate associated with performing the first read operation satisfies the error rate threshold, performing a second read operation of the set of read operations on the plurality of memory cells using a sequential demarcation voltage of the first plurality of demarcation voltages.

18. The non-transitory computer-readable storage medium of claim 15, wherein the plurality of demarcation voltages is determined based on predefined media characterization, wherein a first demarcation voltage of the second plurality of demarcation voltages corresponds to a lower voltage than a first demarcation voltage of the second plurality of demarcation voltages associated with the first request type and wherein performing the error recovery operation associated with the second request type further comprises:
   performing a first read operation on the plurality of memory cells using a demarcation voltage of the second plurality of demarcation voltages;
   determining an error rate associated with performing the first read operation;
   determining that the error rate associated with performing the first read operation satisfies an error rate threshold; and
   responsive to determining that the error rate associated with performing the first read operation satisfies the error rate threshold, performing a second read operation on the plurality of memory cells using a sequential demarcation voltage of the second plurality of demarcation voltages.

19. The non-transitory computer-readable storage medium of claim 15, wherein the processing device is to perform operations further comprising:
   responsive to receiving the request to perform the memory access operation on the plurality of memory cells of the memory device, determining that the plurality of memory cells is associated with a write disturb error.

20. The non-transitory computer-readable storage medium of claim 15, wherein determining the request type associated with the memory access operation comprises:
   determining that the request type associated with the memory access operation is the first request type based on a bit of a plurality of bits associated with the memory access operation.

* * * * *